3,051,684
ORGANOSILOXANE POLYMERS CONTAINING POLYDIENE BLOCKS
Maurice Morton, Akron, Ohio, and Alan Rembaum, Altadena, Calif., assignors to The Board of Directors of The University of Akron, Akron, Ohio
No Drawing. Filed Mar. 26, 1959, Ser. No. 802,028
27 Claims. (Cl. 260—46.5)

This invention relates to organosiloxane polymers. More particularly it relates to linear liquid and solid block polymers of organosiloxanes and diene, vinyl and cyclic oxide or sulfide monomers. It includes the vulcanizates of these whether elastomeric or resinous block polymers. The invention includes also a new method of polymerizing organosiloxanes. This is used in the production of homopolymers and the production of the new block copolymers. It utilizes a carbanion-producing catalyst and a coordinating solvent such as will be defined more particularly in what follows.

THE INVENTION

It has been known that organosiloxanes, such as octamethylcyclotetrasiloxane which has the formula

and is referred to herein as $D_4$, can be opened and polymerized. This has not heretofore been done by a carbanion-producing catalyst with the organosiloxane in a coordinating solvent. Such polymerizations can be carried out at room temperature, as well as above room temperature. Reactions at room temperature are readily controlled and produce improved high-molecular-weight polymers and block copolymers.

Although liquid organosiloxane elastomers are known, and the prior art makes reference to producing solid organosiloxane elastomers, it has been customary to produce solid elastomers by adding silica or other filler to a liquid elastomer to make it sufficiently viscous to be worked on a rubber mill or other rubber mixing equipment. Both the elastomeric polymers and block copolymers to which reference is made herein, and also the resinous polymers can be made of any molecular weight, the molecular weight depending only upon the ratio of the catalyst to the siloxane or other monomer present. To produce solid elastomers or resins (i.e. homopolymers or block copolymers of high molecular weight), less than 0.1 percent of catalyst will be used (based on the weight of the monomer), and usually the amount of catalyst used to produce solid elastomers will be of the order of 0.01 percent. For the production of lower molecular weight products (including liquids) larger amounts of catalyst are used than are required for the production of solids. The higher molecular weight elastomers can be mixed on ordinary rubber-mixing equipment without the addition of filler.

The new block copolymers obtained with diene monomers have the high-temperature properties which make the polyorganosiloxane elastomers valuable. They and the vulcanizates derived from them can be used where the polyorganosiloxanes and their vulcanizates have been used, as in the manufacture of high-temperature sealants (e.g. gaskets, rings, etc.), tubing (fuel lines), insulation, motor mountings, and a multitude of molded and extruded products. The diene block copolymers can be blended with polymers of the diene employed, in almost any proportions. The fact that the polymer and block copolymers can be made at room temperature is a tremendous advantage over the prior polymerization processes. The fact that they are sulfur-vulcanizable, and the known vulcanization techniques can be used, with known accelerators of vulcanization, antioxidants, etc. makes them very attractive.

Likewise, the new block copolymers obtained with vinyl monomers have the high temperature properties characteristic of the polysiloxanes, and the vinyl monomers impart characteristics of the polyvinyl polymers thereto. They can be used for the manufacture of any and all of the high-temperature resistant plastic or resinous products now made of polysiloxanes, and can be blended in almost all proportions with polymers of the vinyl monomer employed.

The organosiloxanes which can be used in the process are the difunctional cyclic organosiloxanes which are recognized as being polymerizable and include those of the formula $(R_2—Si—O)_n$ in which $n$ is 3 or higher up to, for example, 5 or 6 and R is alkyl, cycloalkyl, aryl, aralkyl, furyl, 2-thienyl, 2-pyridyl, etc., including halogen- and nitrogen-containing alkyl and aryl, etc. groups, and ether and thioether derivatives thereof. The two substituents may be the same or different. The length of the alkyl group is not critical, and can contain up to 10 or more carbon atoms. As illustrative, the term organosiloxane as used herein includes those in which the two R's in the formula are dimethyl, diethyl, dipropyl, dibutyl, dihexyl, dicyclohexyl, dioctyl, didecyl, methylethyl, methylhexyl, methylnonyl, ethylpentyl, ethylheptyl, propylbutyl, propyloctyl, butyldecyl, pentyloctyl, dibenzyl, diphenyl, methylphenyl, octylphenyl, ethyltolyl, methyl-2-furyl, di-2-thienyl, ethyl-2-thienyl, methyl-2-pyridyl, condensation products with ethers and thioethers, etc. The halogen, nitrile, amine, etc. derivatives of the foregoing are included, although the chloroalkylsiloxanes are very rapid in their reaction. Thus, assigning different values to $n$, the organosiloxanes which can be polymerized and formed into block copolymers according to this invention include, in addition to $D_4$, hexamethyl cyclotrisiloxane
1,3,5-trimethyl-1,3,5-triphenylcyclotrisiloxane
1,3,5,7-tetramethyl-1,3,5,7-tetraphenylcyclotetrasiloxane
1,3,5-trimethyl-1,3,5-triethylcyclotrisiloxane
1,3,5,7-tetramethyl-1,3,5,7-tetra-n-propylcyclotetrasiloxane
octaphenylcyclotetrasiloxane
1,3,5,7-tetramethyl-1,3,5,7-tetra-2-thienylcyclotetrasiloxane
1,3,5,7,9-pentamethyl-1,3,5,7,9-penta-2-thienylcyclopentasiloxane, etc.
1,3,5,7-tetramethyl-1,3,5,7-tetra-3,3,3-trifluoropropylcyclotetrasiloxane
1,3,5,7-tetramethyl-1,3,5,7-tetra-4-cyanophenylcyclotetrasiloxane
1,3,5,7-tetramethyl-1,3,5,7-tetra-2-pyridylcyclotetrasiloxane They form difunctional polyorganosiloxanes.

The solvents used in the production of these polymers and block copolymers are capable of coordinating the siloxanes and catalysts, such as those which contain oxygen and nitrogen. Since a solvent that coordinates the siloxanes, also coordinates the catalysts, the solvents are referred to herein as belonging to the class consisting of the non-acid oxygen-containing and nitrogen-containing organic solvent capable of coordinating with the catalyst solvents. They include, for example, tetrahydrofurane (hereinafter called THF), tetrahydropyrane, dimethylaniline and other tertiary amines, dimethyl ether or diethylene glycol, diethyl ether of diethylene glycol, dioxane, etc. Solvents which contain acid hydrogen cannot be used.

The carbanion-producing catalysts which can be used include the active alkali metals as well as the aromatic complexes and derivatives, such as are obtained from nahpthalene, anthracene, stilbene, fluorene, and so on, including, for example, the following

| | |
|---|---|
| Sodium | Sodium stilbene |
| Potassium | Potassium stilbene |
| Rubidium | Rubidium stilbene |
| Cesium | Cesium stilbene |
| Sodium naphthalene | 9-Fluorenyl sodium |
| Potassium naphthalene | 9-Fluorenyl potassium |
| Rubidium naphthalene | 9-Fluorenyl rubidium |
| Cesium naphthalene | 9-Fluorenyl cesium |
| Sodium anthracene | Diphenyl sodium |
| Potassium anthracene | Diphenyl potassium |
| Rubidium anthracene | Diphenyl rubidium |
| Cesium anthracene | Diphenyl cesium |

The system employed affects the maximum molecular weight obtainable, and a system which contains a very slight trace of water will not yield polymers of as great molecular weight as can be produced in complete absence of water. Oxygen, carbon dioxide, acids and compounds containing acid-producing groups have a similar effect in that they destroy the catalyst and terminate the polymerization. The concentration of polymer in solution determines the conversion of monomer into polymer and thereby is another controlling factor in the molecular weight obtainable.

The process, whether homopolymerization or block copolymerization, is preferably carried out at room temperature and atmospheric pressure, although higher and lower temperatures and pressures can be used.

The vinyl and diene monomers from which the block copolymers are formed include—

| | |
|---|---|
| Styrene | Methyl acrylate |
| Butadiene | Alpha-methyl styrene |
| Isoprene | 2,5-dichlorostyrene |
| Chlorobutadienes | Methacrylonitrile |
| Methyl methacrylate | Vinylidene chloride |

Alkyl homologues of the foregoing can be used, the length of the alkyl chain not being critical. The many vinyl and diene monomers known to the art which have a hydrocarbon backbone can be used.

The block copolymers have polyorganosiloxane end segments. They may have a single polyvinyl or polydiene segment between these end segments, or polysiloxane segments alternating with polyvinyl or polydiene segments between the end segments. As explained, other polymer segments may be included between the polyorganosiloxane and the polyvinyl or polydiene segments. In different block copolymers the ratio of the weight of the individual polyorganosiloxane segments to the one or more polyvinyl or polydiene segments may vary. The percentage weight of the polyvinyl or polydiene segment or segments should be at least 2 or 3 percent in order to affect the properties of the copolymer, and to provide for its sulfur vulcanization. On the other hand the percentage weight of the one or more polyvinyl or polydiene segments may be as much as 95 percent. It is doubtful if the polysiloxane will have any effect on the properties of the block copolymer unless present in an amount of at least 5 percent. A minute amount of the polysiloxane may affect the surface properties of the product due to its highly water repellant properties, and the slick non-friction surface obtained by extrusion, etc.

The block copolymers obtained with dienes, i.e. their polydiene segment or segments, are vulcanizable by sulfur as well as other chemicals used for curing natural rubber. They can be vulcanized or cured just like natural rubber, as by vulcanization with free sulfur and by sulfur donors, well known in the art, such as polysulfides including disulfides, alkylphenol sulfides, oximes, p-dinitrosobenzene, azodicarboxylates, sulfur dichloride, N,N'-dithioamines, tetramethylthiuram disulfide, tetraethylthiuram disulfide, etc. The processes employed for the vulcanization of natural rubber are possible, such as milling the vulcanizing agent into the copolymer and then heating, painting with sulfur chloride, etc. Film and sponge as well as molded and extruded products can be formed.

In the various different types of vulcanization, the accelerators known for such purposes can be used. Antioxidants that can be used include, for example, phenyl-beta-naphthylamine, heptylated diphenylamine, triphenyl phosphite, di-tertiary butyl hydroquinone, 2,2,4-triethyl-6-phenyl-1,2-hydroquinoline, etc. The usual fillers can be used such as carbon blacks, silica, clay, barytes, titanium dioxide and other pigments, etc.

The block copolymers obtained from vinyl monomers and siloxanes can be cured with curing agents used to cure the polysiloxanes. For instance, peroxides, ferric octoate, high energy radiation, etc. can be used for curing styrene-siloxane block copolymers. They can be compounded with stabilizers, plasticizers, etc. used in the treatment of vinyl polymers, with like effect but limited by the amount of vinyl polymer in the block copolymer.

The invention is illustrated by the following examples, which are to be considered as illustrating rather than limiting the invention.

EXAMPLES OF POLYMERIZATION

*Example I*

Anhydrous $D_4$ and anhydrous THF were each degassed by pumping under high vacuum, i.e., $10^{-6}$ mm. of mercury. Then, 10 ml. of each were mixed in a pyrex tube containing a potassium metal mirror. The mirror had been formed by sublimation of solid potassium under high vacuum. After standing in contact with the mirror for 30 minutes, the solution was filtered through a medium porosity fritted glass disk into a receiving bulb which was next sealed under vacuum. Polymerization then proceeded in the bulb at room temperature, and, after a period of 4 hours, was essentially complete. The highly viscous solution was allowed to stand for an additional 20 hours at room temperature in order to ensure equilibrium conditions. It was then found that 70 percent of the $D_4$ was converted to polydimethylsiloxane. The viscosity average molecular weight of the siloxane polymer was 371,000 gr. per mole. A product of greater molecular weight is produced by volatilizing some of the solvent after filtration.

*Example II*

Eightly ml. of THF and 20 ml. of $D_4$ were treated and mixed as described in Example I, and allowed to stand 30 minutes. After filtering, the solution was divided into two equal portions under high vacuum. Analysis of one part showed that 8 percent of the $D_4$ was converted to siloxane polymer of relatively low molecular weight, i.e., 11,000 gr. per mole.

The second 50-ml. portion was retained under high vacuum, and to this active solution was added 155 ml. of anhydrous, degassed $D_4$. After a few hours at room temperature, a relatively immobile solution was attained. Analysis, after the usual total reaction time of 24 hours for ensurement of equilibrium, showed a value of 87.4 for the percent conversion of monomer to polymer. The viscosity average molecular weight of the polydimethylsiloxane was $9.4 \times 10^6$ grams per mole. The product was a rubbery crumb.

*Example III*

A solution of 200 mg. of naphthalene in 50 ml. of anhydrous THF was first degassed by pumping under high vacuum and then added to a glass tube containing a potassium metal mirror. The resulting dark green potassium naphthalene solution was filtered through a medium porosity glass fritted disk, divided into portions, and used as catalyst in the polymerization of $D_4$.

0.06325 millimole of the potassium naphthalene complex in solution in THF, 0.161 mole of anhydrous, degassed $D_4$ and 0.638 mole of degassed, anhydrous THF were mixed under high vacuum in a flask which was subsequently sealed. A highly viscous, brown-colored solution was obtained during 4 hours reaction at room temperature. The reaction was allowed to continue for 20 hours, although very little change was evident. At the end of this period, 70 percent of the monomer was converted to polymer having a viscosity average molecular weight of $1.585 \times 10^6$ gr. per mole. The isolated product was a rubbery solid.

EXAMPLES OF BLOCK COPOLYMERIZATION

*Example IV*

Two hundred ml. of anhydrous, degassed THF was distilled under high vacuum into a flask containing a potassium metal mirror. Next, 8.4 gr. of anhydrous, degassed styrene was added to the flask dropwise with stirring at $-80°$ C. An instantaneous polymerization occurred which produced a dark red solution. The solution was filtered through a medium porosity glass fritted disk into receiving flasks under high vacuum. A portion of the red solution was analyzed and was found to contain polystyrene with a number average molecular weight of 160,000 gr. per mole.

To a second portion of the red solution containing 3.3 gr. of the carbanion terminal polystyrene in 78 ml. of THF, 5.4 gr. of anhydrous, degassed $D_4$ was added dropwise and with stirring. The reaction mixture was stirred under high vacuum at room temperature for several hours during which time the THF solvent was continuously distilled until approximately 20 ml. of solution remained. The red color faded to a translucent pink during the distillation, and the viscosity increased markedly. After termination with methyl iodide, the solution was found to contain 6.6 gr. of block copolymer composed of polydimethylsiloxane segments attached to a polystyrene center. This copolymer could not be separated into polystyrene and polydimethylsiloxane by use of selective solvent extraction. The resin produced was a white powder.

*Example V*

Six and three-tenths gr. of anhydrous, degassed styrene was added dropwise with stirring at $-80°$ C. to 100 ml. of THF solution containing 0.24 millimole of potassium naphthalene catalyst. The catalyst was prepared as described previously in Example III. An instantaneous polymerization accompanied by a color change from green to red was noted. Analysis of a portion of the red solution showed the polystyrene to have a number average molecular weight of 56,000 gr. per mole.

Sixty four gr. of anhydrous, degassed $D_4$ was added with stirring at room temperature to 250 ml. of THF solution containing 2.4 gr. of the carbanion terminated polystyrene prepared as described in the preceding paragraph. In order to shift the equilibrium, 180 ml. of THF was removed by distillation as the reaction mass was stirred at room temperature, and polymerization proceeded with a color change from red to white. After 16 hours, the solution yielded 42.1 gr. of block copolymer containing 5.7 percent of a polystyrene center and 92.3 percent polydimethylsiloxane segments attached thereto. Separation could not be achieved by selective solvent extraction. The product was a viscous white gum.

*Example VI*

Forty-one and two-tenths gr. of anhydrous, degassed isoprene was added dropwise with stirring at $-80°$ C. under high vacuum to 240 ml. of THF in a flask containing a potassium metal mirror. The solution turned brownish-red in color during the polymerization reaction. The solution yielded polyisoprene with a number average molecular weight of 66,000 gr. per mole.

Forty-seven and one-half gr. of anhydrous, degassed $D_4$ was added dropwise with stirring to a solution of 15.6 gr. of carbanion terminated polyisoprene in 200 ml. of THF, prepared as described in the preceding paragraph. The reaction mass was stirred at room temperature for several hours, and 125 ml. of the THF solvent was removed by distillation under high vacuum during this period. A color transition from brownish-red to white accompanied the polymerization reaction, and a marked increase in viscosity was observed. 51.2 gr. of block copolymer was obtained containing 30.5 percent of a polyisoprene center and 69.5 percent of polydimethylsiloxane ends. Homopolymer could not be obtained by selective solvent extraction. This product is a soft white sulfur-vulcanizable gum. It is compatible with other rubbers in a wide range of proportions.

A terpolymer is obtained by adding any monomer polymerizable by carbanion, before adding the $D_4$. Thus by adding 2 grams of an alkylene sulfide or an alkylene oxide, e.g. ethylene sulfide or ethylene oxide, and producing a block copolymer before adding $D_4$ as above described, a terpolymer is formed. Two or more such other segments may in this way be interposed between the polyisoprene center segment and the polysiloxane end segments.

*Example VII*

Forty gr. of anhydrous, degassed isoprene was added dropwise with stirring at $-80°$ C. to 240 ml. of THF containing 0.267 millimole of potassium naphthalene catalyst. An instantaneous color change from green to brownish-red was noted. The number average molecular weight of the polyisoprene thus formed was 300,000 gms. per mole.

Twelve gr. of degassed, anhydrous $D_4$ was added dropwise to 150 ml. of the THF solution containing 22.3 gr. of carbanion-terminated polyisoprene. 100 ml. of THF was removed under high vacuum while stirring the reaction mass at room temperature. A color change from brownish-red to white and an increase in viscosity was observed during the polymerization. The reaction was terminated with methyl iodide or trimethylchlorosiloxane, and yielded 30.5 gr. of block copolymer containing 27 percent polydimethylsiloxane segments attached to a 73 percent polyisoprene center. Selective solvent extraction of this copolymer did not give any homopolymer. The product is a rubbery white crumb.

*Example VIII*

This example illustrates the coupling of the polysiloxane ends of an isoprene-siloxane block copolymer to form higher molecular weight block copolymers. A di-functional chlorosilane was used to react with the potassium silanolate chain ends producing longer chains.

Thirty grams of anhydrous, degassed isoprene was added with stirring to 0.749 millimole of potassium naphthalene catalyst dissolved in 35 ml. of anhydrous, degassed tetrahydrofuran. After polymerization for 1 hour at 0° C., twenty-four grams of anhydrous, degassed $D_4$ was added and thoroughly mixed with the active polymer solution.

After polymerization for 12 hours at room temperature, the polymer solution was divided. The polymerization of one portion was terminated with methyl iodide, coagulated in methanol and vacuum dried at 60° C. The composition of this block copolymer was found to be 70 percent polyisoprene and 30 percent polysiloxane by weight. The intrinsic viscosity of this block copolymer, measured in benzene at 30° C., was found to be 0.375.

Three-tenths millimole of dimethyldichlorosilane was added to another portion of the 70/30 isoprene-siloxane block copolymer dissolved in anhydrous, degassed tetrahydrofuran. This portion weighed 30 grams. A significant increase in the viscosity of the solution was noted. After four hours reaction time, methyl iodide was added to terminate residual silanolate chain ends. The intrinsic viscosity of the extended block copolymer, measured in benzene at 30° C., was found to be 0.495.

These intrinsic viscosity values indicate that the molecular weight of the "coupled" block copolymer is approximately double the molecular weight of the control.

This "coupled" block copolymer can be vulcanized. The examples given herein as illustrative of the vulcanization of the other block copolymers described herein, are equally suited to the vulcanization of this type of block copolymer.

EXAMPLES OF VULCANIZATION

Example IX

In this example, the block copolymer described above in Example VI, together with a silica aerogel (Valron Estersil manufactured by E. I. du Pont de Nemours and Company, Inc.), as a reinforcing agent, sulfur, benzothiazyl disulfide, and diphenyl guanidine were mixed together and compounded on a 2-roll differential laboratory mill.

Formulation: Parts
(a) 69.5/30.5 Poly(dimethylsiloxane-isoprene) ------------------------------ 100
(b) Silica aerogel------------------------ 45
(c) Sulfur ------------------------------- 3
(d) Benzothiazyl disulfide--------------- 1.25
(e) Diphenyl guanidine------------------ 0.25

The resulting mixture was then molded in a closed mold and press-cured 30 minutes at about 150° C. The flat sheets thereby produced were found to be insoluble in the usual organic solvents (e.g. benzene, toluene, hexane, heptane, pentane, gasoline, etc.) and to have a tensile strength of 1150 pounds/square inch and an ultimate elongation of 750 percent.

Example X

The block copolymer described above in Example VI, together with silica aerogel (specifically Valron Estersil manufactured by E. I. du Pont de Nemours and Company, Inc.), and benzoyl peroxide were mixed and compounded together on a 2-roll differential laboratory mill.

Formulation:
(a) 69.5/30.5 Poly(dimethylsiloxane-isoprene) ------------------------------ 100
(b) Silica aerogel------------------------ 45
(c) Benzoyl peroxide--------------------- 0.9

After mixing the ingredients, the mixture was then molded in a closed mold in the form of flat sheets at about 110° C. for about 15 minutes. Thereafter, the molded specimens were heat-treated at about 150° C. for about 2 hours. The vulcanizates so produced were found to be insoluble (as above) and to have a tensile strength of 1200 pounds per square inch and an ultimate elongation of 375 percent. It is useful for tubing, gaskets, O-rings, seals of all sorts, etc.

Example XI

This example illustrates the vulcanization of the poly(dimethylsiloxane-isoprene) block copolymer described above in Example VII without the use of reinforcing pigments. Block copolymer containing 27 percent polydimethylsiloxane and 73 percent polyisoprene, together with sulfur, benzothiazyl disulfide, and diphenyl guanidine were mixed and compounded together on a 2-roll differential laboratory mill.

Formulation: Parts
(a) 27/73 Poly(dimethylsiloxane-isoprene)-- 100
(b) Sulfur ------------------------------- 3
(c) Benzothiazyl disulfide--------------- 1.25
(d) Diphenyl guanidine------------------ 0.25

The compounded mixture was then molded in a closed mold in the form of flat sheets at about 150° C. for about 30 minutes. The resulting insoluble vulcanizate possessed an ultimate tensile strength of 1250 pounds per square inch at 700 percent elongation.

Example XII

In this example the poly(dimethylsiloxane-isoprene) block copolymer described above in Example VII was blended with Hevea rubber, sulfur, benzothiazyl disulfide, and diphenyl guanidine on a 2-roll differential laboratory mill.

Formulation: Parts
(a) 27/73 Poly(dimethylsiloxane-isoprene)-- 50
(b) Hevea rubber------------------------ 50
(c) Sulfur ------------------------------- 3
(d) Benzothiazyl disulfide--------------- 1.25
(e) Diphenyl guanidine------------------ 0.25

After compounding and mixing the ingredients, the mixture was molded and press-cured as described above in Example X. The resulting vulcanizate was tough, rubbery, and insoluble in common solvents.

Instead of terminating the reaction with methyl iodide, other terminating agents can be used such as trimethyl chlorosilane or other mono-functional silanes, etc. The product is useful in fuel-line tubings, oven seals, motor mountings, etc.

The invention is covered in the claims which follow.

What we claim is:

1. A linear block copolymer produced by anionic polymerization, each of the two terminal segments of which copolymer is a di-functional polyorganosiloxane segment, the copolymer having at least one sulfur-vulcanizable polydiene intermediate segment of the class consisting of polymers of conjugated diolefin hydrocarbons and chlorohydrocarbons, and containing sufficient diene content to permit vulcanization and sufficient polyorganosiloxane content to modify the properties of the copolymer, and where there is more than one polydiene segment each two such segments are separated by a polymer of a monomer polymerizable by carbanion.

2. A linear block copolymer each of the two terminal segments of which copolymer is a di-functional polyorganosiloxane segment, the copolymer having at least one sulfur-vulcanizable polydiene intermediate segment of the class consisting of polybutadiene, polyisoprene and the polychlorobutadienes, and containing sufficient diene content to permit vulcanization and sufficient polyorganosiloxane content to modify the properties of the copolymer, and where there is more than one polydiene segment each two such segments are separated by a polymer of a monomer polymerizable by carbanion.

3. A linear block copolymer which comprises two terminal di-functional polyorganosiloxane segments, at least one intermediate di-functional polyorganosiloxane segment, and at least one polydiene segment between each two of its polyorganosiloxane segments, each polydiene segment being of the class consisting of polymers of conjugated diolefin hydrocarbons and chlorohydrocarbons, said copolymer being formed by copolymerizing di-functional polyorganosiloxane segments and polydiene segments by anionic polymerization and joining two terminal polyorganosiloxane segments of the copolymer thus formed with di-functional silane.

4. A linear block copolymer composed of two terminal di-functional polyorganosiloxane segments, at least one intermediate polyorganosiloxane segment, and between each two polyorganosilane segments a polydiene of the class consisting of polybutadiene, polyisoprene and the polychlorobutadienes.

5. The process of producing a linear block copolymer which comprises polymerizing a monomer of the class consisting of vinyl monomers and conjugated diolefin hydrocarbon and chlorohydrocarbon monomers with a carbanion-producing catalyst in a non-acid oxygen-containing and nitrogen-containing organic solvent capable of coordinating with the catalyst, adding a polyorganosiloxane segment to the carbanion at each end thereof by polymerization of di-functional cyclic organosiloxane in the solution, said catalyst being of the group consisting of the alkali metals and their organometallic derivatives, and then forming longer-chain linear block copolymer from said polysiloxane-terminated copolymers by coupling terminal polyorganosiloxane segments thereof by adding a di-functional silane to the solution.

6. The process of claim 5 in which carbanion-terminated polyolefin is the only polymer present in the solution at the start of the formation of the polyorganosiloxane segments.

7. An elastomeric sulfur-vulcanizate of the copolymer of claim 2.

8. An elastomeric sulfur-vulcanizate of the copolymer of claim 1.

9. The block copolymer of claim 1 in which polyorganosiloxane segments are dimethylsiloxane segments.

10. The block copolymer of claim 1 in which there is only one intermediate segment and its ends are attached directly to the polyorganosiloxane segments.

11. The block copolymer of claim 1 in which there is a polyalkylene sulfide segment between said intermediate segment and each terminal segment.

12. The block copolymer of claim 1 in which there is a polyalkylene oxide segment between said intermediate segment and each terminal segment.

13. The method of producing a block copolymer chain which comprises polymerizing a diene with a carbanion-producing catalyst in a non-acid oxygen-containing and nitrogen-containing organic solvent capable of coordinating with the catalyst, said diene being of the class consisting of conjugated diolefin hydrocarbons and chlorohydrocarbons and adding a polyorganosiloxane segment to the carbanion at each end thereof by polymerization of difunctional organosiloxane in the solution, said catalyst being of the group consisting of the alkali metals and their organometallic derivatives.

14. The method of claim 13 in which carbanion-terminated polydiene is the only polymer present in the solution at the start of the formation of the polyorganosiloxane segments.

15. The method of claim 13 in which a polyalkylene sulfide segment is formed in the solution on the carbanion ends of the polymerized diene by polymerization of a polyalkylene sulfide in said solution, and the polyorganosiloxane segments are formed by polymerization of organosiloxane thereto.

16. The method of claim 13 in which a polyalkylene oxide segment is formed in the solution on the carbanion ends of the polymerized diene by polymerization of a polyalkylene oxide in said solution, and the polyorganosiloxane segments are formed by polymerization of organosiloxane thereto.

17. An elastomeric sulfur-vulcanizate of the copolymer of claim 9.

18. An elastomeric sulfur-vulcanizate of the copolymer of claim 10.

19. An elastomeric sulfur-vulcanizate of the copolymer of claim 11.

20. An elastomeric sulfur-vulcanizate of the copolymer of claim 12.

21. An elastomeric sulfur-vulcanizate of the copolymer of claim 1.

22. The process of producing a sulfur vulcanizate which comprises heating the block copolymer of claim 1 under vulcanizing conditions with a vulcanizing agent of the class consisting of sulfur and sulfur-donors.

23. The process of producing a sulfur vulcanizate which comprises heating the block copolymer of claim 9 under vulcanizing conditions with a vulcanizing agent of the class consisting of sulfur and sulfur-donors.

24. The process of producing a sulfur vulcanizate which comprises heating the block copolymer of claim 10 under vulcanizing conditions with a vulcanizing agent of the class consisting of sulfur and sulfur-donors.

25. The process of producing a sulfur vulcanizate which comprises heating the block copolymer of claim 11 under vulcanizing conditions with a vulcanizing agent of the class consisting of sulfur and sulfur-donors.

26. The process of producing a sulfur vulcanizate which comprises heating the block copolymer of claim 12 under vulcanizing conditions with a vulcanizing agent of the class consisting of sulfur and sulfur-donors.

27. The process of producing a sulfur vulcanizate which comprises heating the block copolymer of claim 3 under vulcanizing conditions with a vulcanizing agent of the class consisting of sulfur and sulfur-donors.

References Cited in the file of this patent

UNITED STATES PATENTS

| | | |
|---|---|---|
| 2,710,290 | Safford et al. | June 7, 1955 |
| 2,716,128 | West | Aug. 23, 1955 |
| 2,867,599 | Hurd et al. | Jan. 6, 1959 |
| 2,959,569 | Warrick | Nov. 8, 1960 |

UNITED STATES PATENT OFFICE
CERTIFICATE OF CORRECTION

Patent No. 3,051,684            August 28, 1962

Maurice Morton et al.

It is hereby certified that error appears in the above numbered patent requiring correction and that the said Letters Patent should read as corrected below.

Column 6, line 39, for "trimethylchlorosiloxane" read -- trimethylchlorosilane --.

Signed and sealed this 25th day of June 1963.

(SEAL)
Attest:

ERNEST W. SWIDER
Attesting Officer

DAVID L. LADD
Commissioner of Patents